United States Patent [19]

Lysle

[11] 3,992,090
[45] Nov. 16, 1976

[54] OPTICAL APPARATUS FOR SELECTIVELY PRODUCING RIPPLED MESSAGE IMAGES IN AREAS OF SPECULAR SURFACED PHOTOPLASTIC FILM AND ERASING SUCH IMAGES FROM SUCH AREAS FOR REUSE

[75] Inventor: Gordon Lysle, Greenlawn, N.Y.
[73] Assignee: Microx Corporation, Hauppauge, N.Y.
[22] Filed: Feb. 27, 1975
[21] Appl. No.: 553,520

[52] U.S. Cl. .................................. 355/9; 96/1.1; 340/173 TP; 346/74 TP; 355/7
[51] Int. Cl.² ...................................... G03G 16/00
[58] Field of Search .................... 355/9, 5, 7, 3 R; 346/74 TP; 340/173 TP; 96/1.1; 219/216

[56] References Cited
UNITED STATES PATENTS

| | | | |
|---|---|---|---|
| 3,370,846 | 2/1968 | Semenhuk | 271/275 |
| 3,653,888 | 4/1972 | Lessman | 340/173 TP |
| 3,697,176 | 10/1972 | Kuehnle et al. | 355/5 |
| 3,781,106 | 12/1973 | Lysle | 355/9 |

Primary Examiner—L. T. Hix
Assistant Examiner—J. A. LaBarre
Attorney, Agent, or Firm—Watson Leavenworth Kelton & Taggart

[57] ABSTRACT

Camera and imaging processing apparatus for producing rippled message images in frame areas of specular surfaced photoplastic film having a conductive substrate below an upper heat-softenable and image rippleable emulsion layer. Images are formed by image patterned electrostatic charge and heat deformation, and are erased at higher temperatures for re-recording. A film support includes a lateral platen having an opening to permit contact of the back of the film with a moveable heatable metallic block to effect conduction heat softening. The conductive substrate of the film is held at ground potential, and a charging apparatus interposed between the film and an objective lens, through which the image to be recorded is projected, imposes a large electrostatic charge differential on the platen to cause the film to be snugged to the platen. The charging apparatus includes a housing which defines an optical aperture. A shutter mechanism is provided between the objective lens and the charging apparatus to control irradiation of the film by the image beam.

9 Claims, 19 Drawing Figures

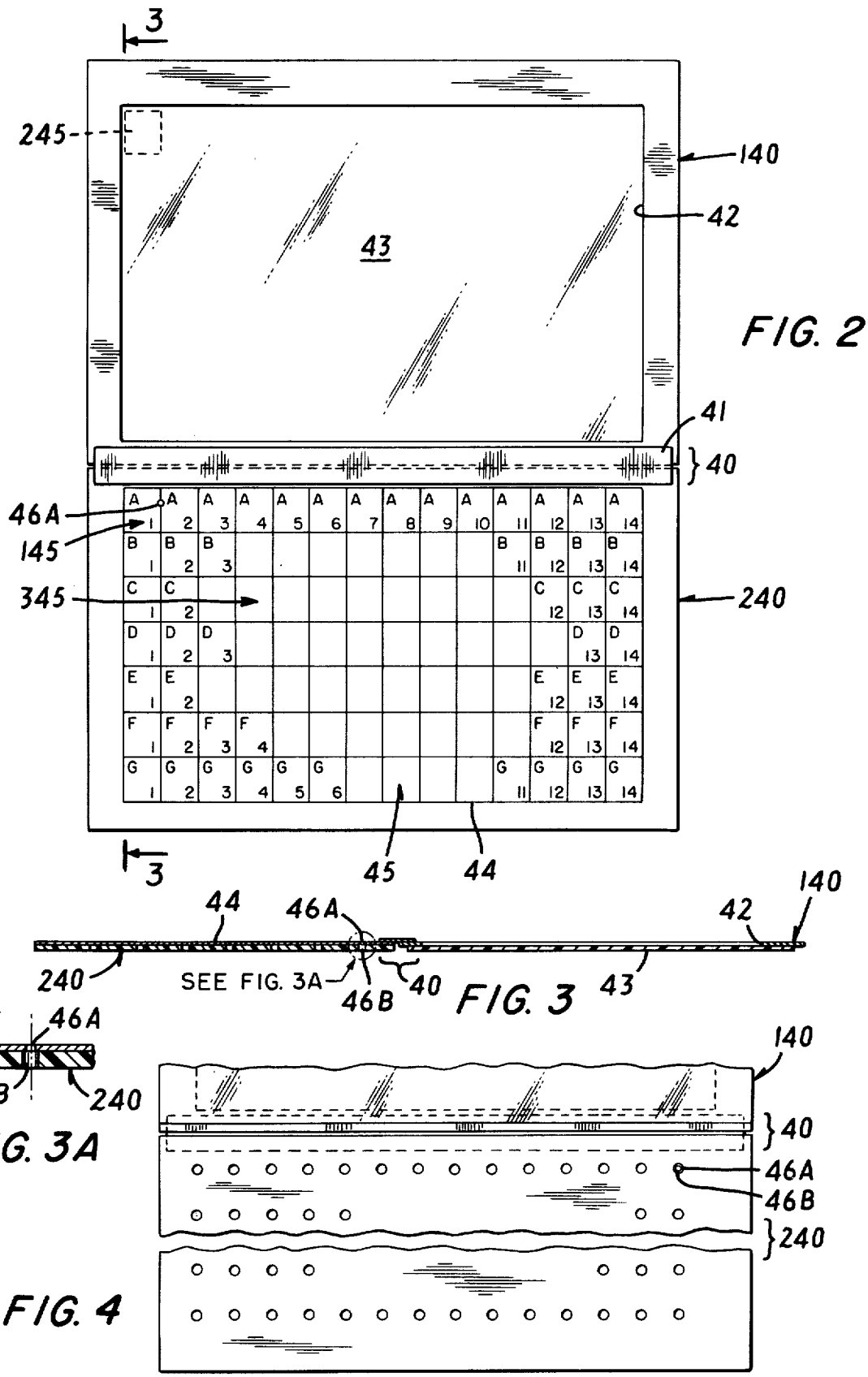

OPTICAL APPARATUS FOR SELECTIVELY PRODUCING RIPPLED MESSAGE IMAGES IN AREAS OF SPECULAR SURFACED PHOTOPLASTIC FILM AND ERASING SUCH IMAGES FROM SUCH AREAS FOR REUSE

SUMMARY

The present invention relates to apparatus for handling, and more particularly processing, photoplastic film which has a specular surface in frame areas of which rippled message images are formed by image patterned electrostatic charges and heat deformation. Prior to the present invention such photoplastic film has been employed in plural-frame microfiche of the applicant's copending U.S. Pat. application Ser. No. 405,913 of Oct. 12, 1973, on which will issue on Mar. 4, 1975 U.S. Pat. No. 3,869,201, and the disclosure of which is being incorporated herein by reference. Also, applicant's prior U.S. Pat. No. 3,781,106 of Dec. 25, 1973 discloses background information relative to the camera/processor apparatus.

This present camera/processor apparatus is, in one version, particularly designed to develop in frames of such a microfiche rippled message images or selectively to erase some such images and replace them with others; and other versions of such camera/processor apparatus may be designed to process such in roll form as a strip thereof which is progressively reeled across a processing area.

The present camera/processor selectively produces such rippled message images in frame areas of a fiche section of photoplastic film by image patterned electrostatic charge and heat deformation ina simple and efficient manner which includes projecting an image bearing light beam through an objective lens unit that focuses it upon a transverse photostatic film supporting means. This supporting means includes a lateral platen that is located back of a section of the photoplastic film which margins a specular surface area in the form of such a film frame. There is provided between the objective lens unit and the platen-supported film area an optical aperture. This film supporting platen has an opening opposite the optical aperture so that the back of the film opposite its specular surface area is accessible in this opening. A heated metallic block is to be movably mounted so that it can be thrust forward into the platen opening for contact of the accessible area of the back of the film to effect conduction heat softening of this film area that is located between the optical aperture and the platen opening, so as to produce therein a rippled frame area.

It is particularly desirable that there may be employed with such camera/processor a known type of film which consists of four layers which include a plastic base ply that may be "Mylar" (polyethylene terephthalate), a conductive layer laid over the film base ply and superposed by a third layer in the form of a photoplastic ply or emulsion, and a top reflective coating which may be of indium. The conductive layer which intervenes the base ply and the photographic ply and may be a nickel-chromium coating is designed to serve as a ground plane for electrostatic charging, and the Mylar base ply is typically a polyester. The photoplastic film or emulsion which intervenes the conductive layer and the reflective top coating is a dispersion of a photoconductor in a thermoplastic polymer matrix. Conductive layer provides grounding means for the section of such film when it is supported upon this apertured platen. Electrostatic charging means imposes upon the film supporting platen a relatively large electrostatic charge differential which causes the platen supported film area to be snugged to the platen.

Such electrostatic charging means preferably is in the form of a corona member confined by conductive walls which include an inlet wall opposed to the objective lens unit with an opening therein permitting entrance of the image-bearing beam emanating from the objective lens unit. The sidewalls of this chamber serve as the collector for corona discharge and the chamber also has an outlet opening facing toward the film supporting platen for passage of the image-bearing light beam to the platen-supported film area.

It is desirable to provide between the objective lens unit and such electrostatic charge means a shutter mechanism which may be opened to pass the image supporting beam onward to the supported film area and to terminate the passage of such beam with a discontinuance of the application of the electrostatic charging action.

Such a camera/processor version may effectively process such photoplastic films for indefinite long periods of time without any interference by the environmental light and heat in the working area in which the apparatus is located. Any currents or drafts of air in the working area will not deleteriously affect the high quality of the produced results, and such efficient and effective attainment is an object of the present invention.

It is a further object to avoid interference between adjacent recorded film frames commonly identified as "cross-talk" that frequently occurs in the practice of other recording procedures which may either employ convection or radiant heating.

A particular advantageous feature of apparatus of the present invention depends upon the employment therein of using specular surfaced photoplastic film which includes a conductive substrate below its upper heat-softenable emulsion that has or is to be provided with rippled images, with this conductive substrate serving as an electrostatic grounding means. In such apparatus which uses such photoplastic film-supporting platen means, advantageously it is of a character as to be conductive, such as by being formed of metallic composition, whereby it may be provided with a relatively large electrostatic charge differential relative to the grounding conductive substrate of the film so as to cause the area of the film that is in supporting contact with the platen effectively to be snugged thereto by an electrostatic charge adherence.

Other objects of the invention will in part be obvious and will in part appear from reference to the following detailed description taken in connection with the accompanying drawings, wherein like numerals identify similar parts throughout, and in which:

FIG. 2 is a top plan view of a typical microfiche in unfolded condition as it is arranged for insertion in the tray through the entrance opening of the apparatus of FIG. 1;

FIG. 3 is a sectional view taken substantially on line 3—3 of FIG. 2;

FIG. 3A is an enlarged sectional detail of a relatively small area of the combined guidance and cover section of the microfiche of FIG. 2;

FIG. 4 is a back plan view, with parts broken away, of the laid out microfiche of FIGS. 2 and 3, illustrating an arrangement of a series of holes through the bottom ply of the guidance and cover section to facilitate the aperture means that may be employed to inform the operator as to any particular image frame of the microfiche which may be occupied by a previously recorded image therein;

Figure 1:
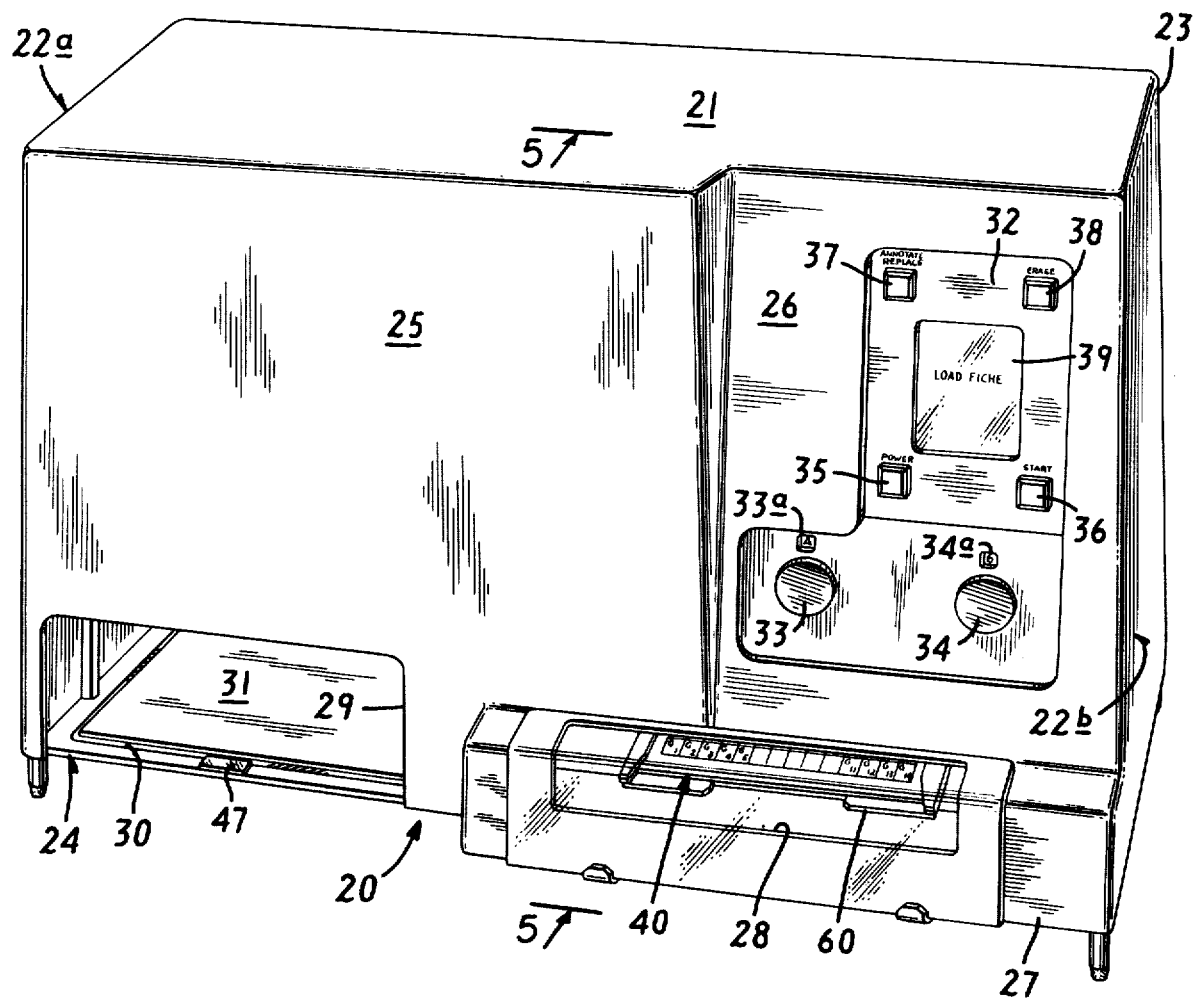
FIG. 1 is the front elevational perspective view of an embodiment of the camera/processor apparatus of the present invention, showing the guidance panel of manual controls associated therewith, the entrance opening for insertion and removal of successive microfiches to be processed therein, and the entrance port for successive record sheets.
Figure 16:
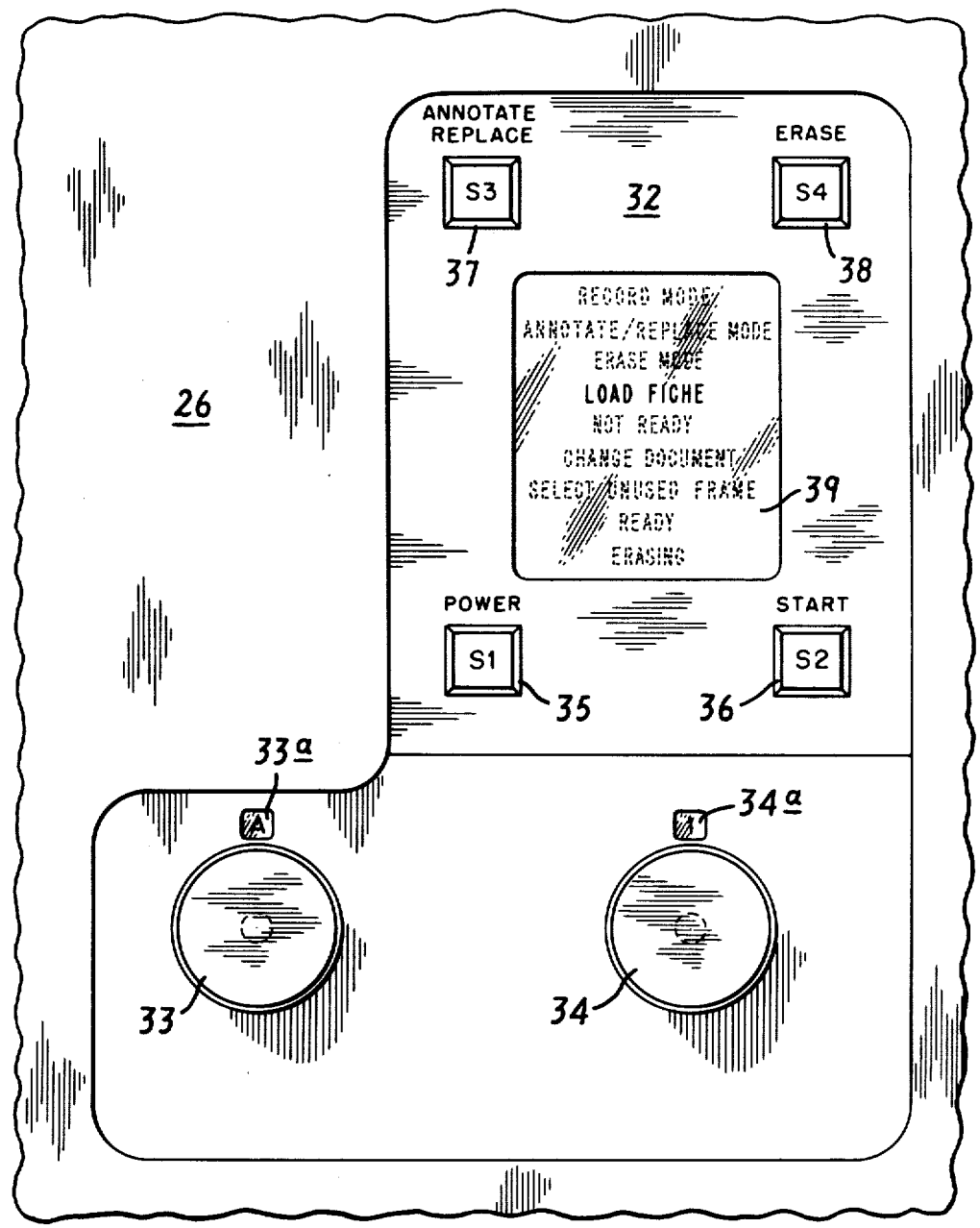
Figure 17:
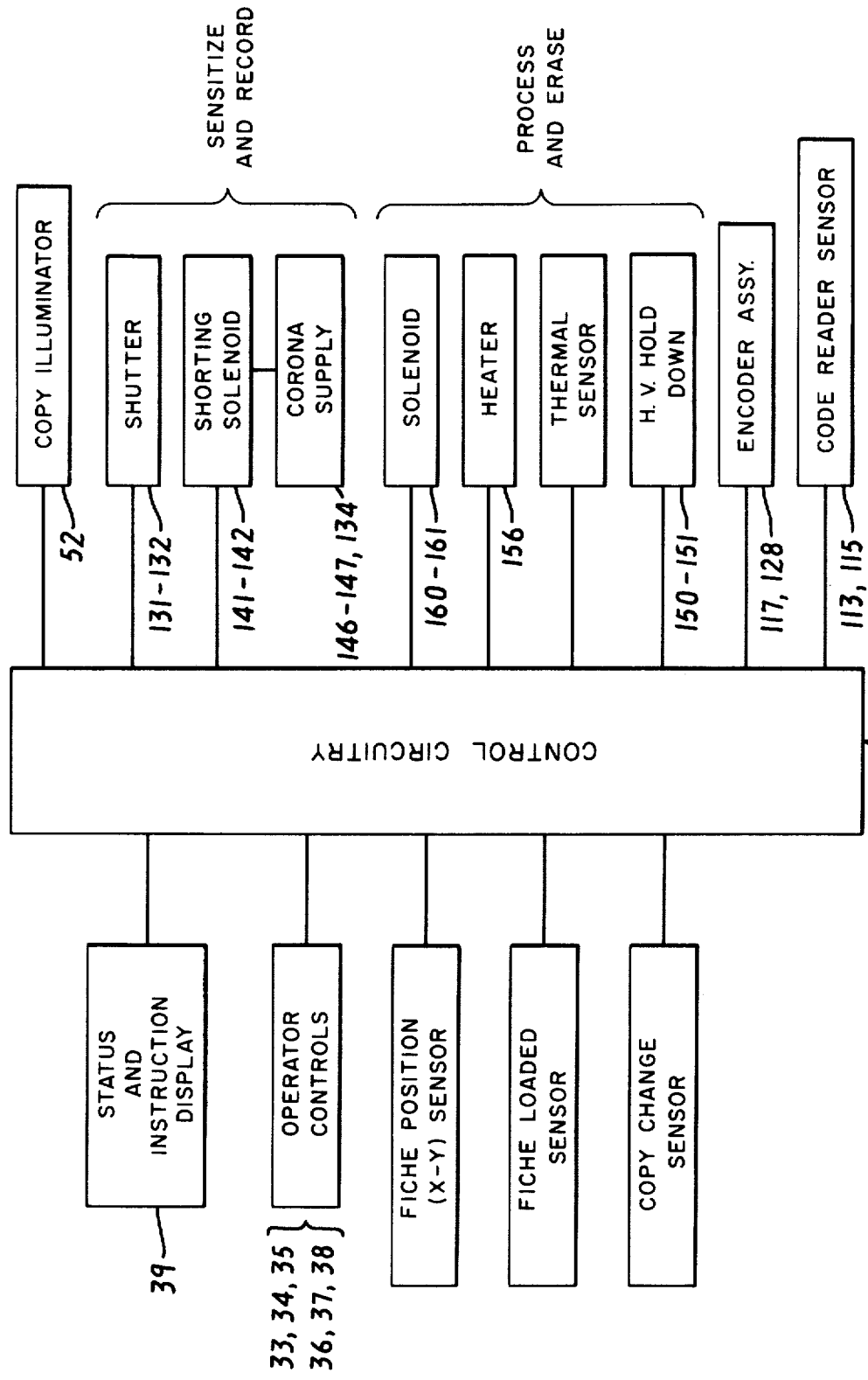

FIG. 16 is an enlarged face view of the guidance panel shown in FIG. 1 to indicate more clearly the manual controls and the operation of the different guidance messages selectively to be displayed upon this panel; and FIG. 17 is a box diagrammatic view of the control circuitry and various associated operating components connected therewith with suitable code labels attached to identify functions thereof.

Figure 5:
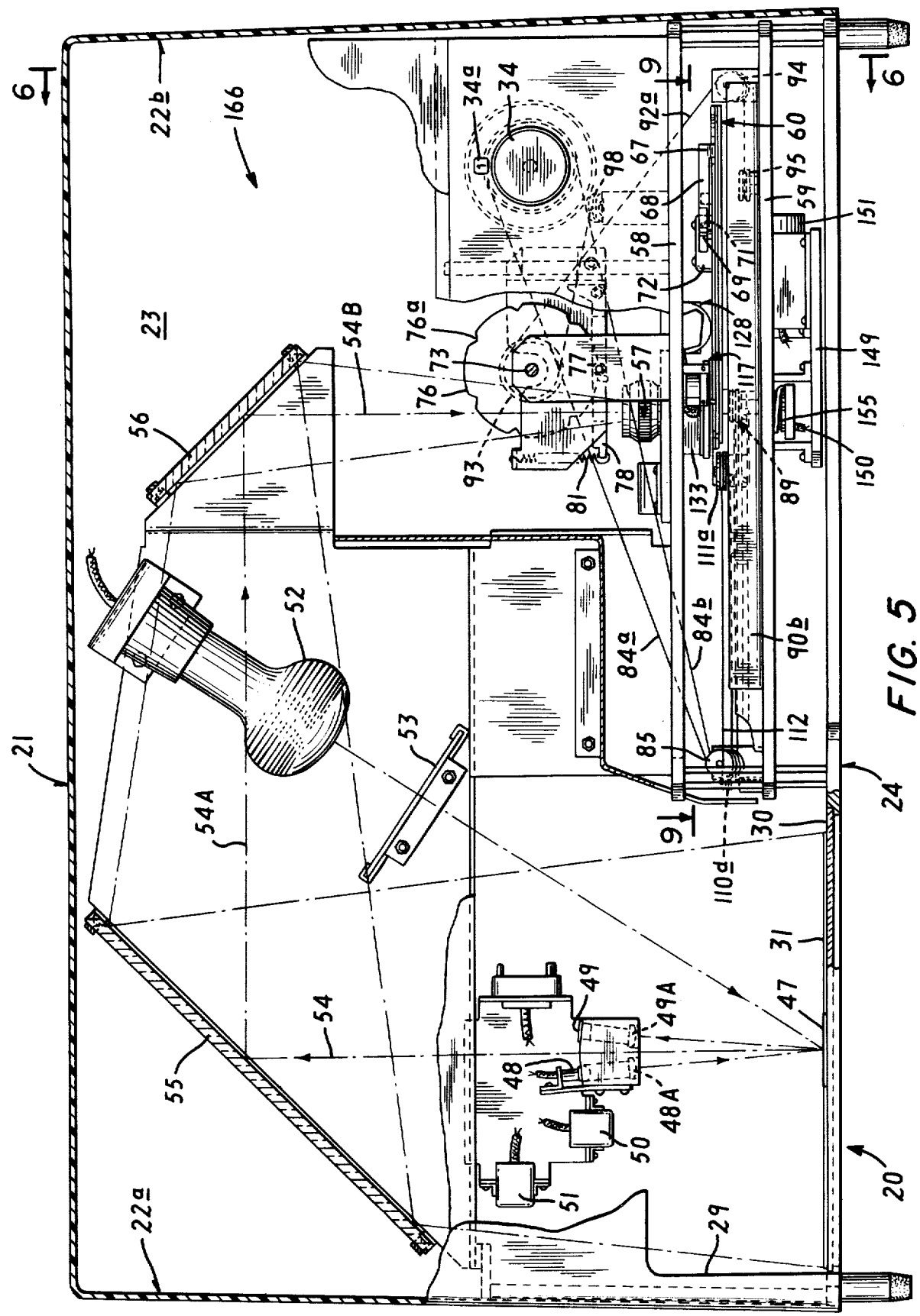
FIG. 5 is an enlarged sectional view taken substantially on line 5—5 of FIG. 1, with parts broken away and in section, illustrating the optical system employed to record an image of a record sheet in a panel of the microfiche.

As is indicted at 20 in FIGS. 1, 5, and 6, the camera/processor therein illustrated includes a housing having a lateral top 21, end walls 22a and 22b, a back wall 23, a lateral bottom wall 24, and a front wall which includes a vertical section 25 and a sloping controls and message section 26, with the provision below the latter and a portion of the former equipped with a front addition 27 having a microfiche entrance opening 28 through which a microfiche may be inserted into the entrance end of the tray there illustrated in FIG. 1, and then removed therefrom. The vertical front wall section 25 has bottom front opening or port 29 through which record sheets may be inserted for temporary lateral support upon platen plate 30, as is best seen in FIGS. 1 and 5 with such a record sheet indicated at 31 therein.

As will be understood from FIGS. 1 and 16 the rearwardly sloping front wall section 26 is provided with an insert panel 32 which carries manual rotary knobs 33 and 34 for transport of the microfiche tray and any microfiche mounted therein both laterally in the X—X and Y—Y directions, respectively. Panel 32 also carries four push buttons S1 (at 35), S2 (at 36), S3 (at 37), and S4 (at 38). As is indicated in FIG. 16 manual push button S1 at 35 is for switching the power for the electrical circuitry of the apparatus on and off; and the push button S2 at 36 is initially to energize the circuitry components for operation. The push button S3 at 37 is for the purpose of energizing the circuitry to operate the apparatus in the "ANNOTATE/REPLACE" mode, and likewise for operation to replace the image of one panel after erasure of another image, as is implied by the word "REPLACE." The push button S4 at 38 is suitably labeled "ERASE" for effecting wipe out of an image in a certain panel for replacement thereof by a new image. It will also be seen that the central display or guidance section 39 of panel 32 is for the purpose of visually indicating thereon certain guidance messages, in the form of illuminated legends, which may helpfully successively be "RECORD MODE", "ANNOTATE/REPLACE MODE," "LOAD FICHE," "NOT READY," "CHANGE DOCUMENT," "SELECT UNUSED FRAME," "READY," and "ERASING." One or more of these back lighted legends is presented to the operator at all times. The display of "Record Mode," "Annotate/Replace Mode" and "Erase Mode" indicate respectively the selected modes of operation. The legends "Load Fiche," "Change Document," and "Select Unused Frame" respectively instruct the operator as to required manipulations. The illuminated legends "Not Ready," and "Ready" alternatively inform the operator as to readiness of the device to perform a cycle in a selected mode, while "Erasing" informs the operator that the erase cycle is in action.

The microfiche 40 disclosed in FIGS. 2, 3, 3A, and 4 is a particular embodiment of such a microfiche construction disclosed and claimed in the copending application Ser. No. 405,913 of Oct. 12, 1973 of the applicant, and on which will issue on Mar. 4, 1975 U.S. Pat. No. 3,869,201, and the disclosure thereof is hereby incorporated in this present application by reference. As will be seen therein the base card structure 40 may be provided as two separate sections 140 and 240 of relatively stiff construction which are hinged together by a strip 41 of adhesive tape of flexible plastic or fibrous material carrying adhesive on one face for anchorage to opposed edges of the base card structure sections. Thus these sections are hingable along a longitudinal medial fold of the tape for lapping the cover section 240 over the film-carrying section 140. The film-carrying section 140 is in the form of a rectangular frame having a window 42 in which is exposed a rectangular sheet 43 of the photoplastic film. This photoplastic film 43 has its edges lapped by the relatively rigid rectangular frame 140 which may be formed of aluminum sheeting or relatively stiff plastic.

Currently, the film consists of four layers which include a plastic base ply that may be of "Mylar" (polyethylene terephthalate), a conductive layer laid over the film base ply and superposed by a third layer in the form of a photoplastic film ply or emulsion, and a top reflective coating which may be of indium to provide the necessary specular surface. The conductive layer which intervenes the base ply and the emulsion ply may be a nickel-chromium coating and is designed to serve as a ground plane for electrostatic charging, and the Mylar base ply is typically a polyester. The photoplastic film which intervenes the conductive layer and the reflective top coating is a dispersion of a photoconductor in a thermoplastic polymer matrix. This plural ply photoplastic film assembly may be relatively thin of the order of about 0.004 inch, which makes the reinforcing rectangular frame 140 useful thereto for effecting reasonable rigidity. Such plural ply photoplastic film assembly may be made thicker, such as of the order of 0.007 inch, so as to eliminate the necessity of the stiffening frame 140. The card section 240 may be of material similar to that from which frame 140 is formed and its top face is overlaid by a relatively thin leaf section or piece of thin paper 44 on which is imprinted a rectilinear grid 45 representative of the array of image frames, in the form of rectangular sections of the photoplastic film 43, on which can be recorded on the desired images and these image frames correspond to the areas delineated by the grid pattern on the overleaf 44.

It will be noted particularly from the lower section of FIG. 1 and FIGS. 3, 3A, and 4 that the marginal dividing lines of the grid pattern 45 are aligned with indicator marks in the form of punched holes 45B in the relatively stiff backing section 240 of the microfiche 40. The grid pattern of these punched holes in the relatively stiff backing sheet 240 intentionally are slightly larger in diameter than any indicator hole which is to be selectively punched within a marginal grid line such as at 46A for there identifying a grid area 145 which corresponds to a film frame area 245, indicated in broken lines in the top left hand corner of FIG. 2. Thus a punch hole 46A at the location indicated will inform the operator or dictate to a control system that grid area 145 and its replica film frame area 245 are occupied by a previously recorded image, and this is true throughout the respective film frame areas and matching grid guidance areas of the microfiche 40 illustrated in FIG. 2.

It will be seen from FIG. 5 that the copy sheet loading port 29 provides access to the lateral platen plate 30 for support of a record sheet 31 thereon and, incidentally, to cover a reflective area 47 on the top surface of this plate, to interrupt a beam from a small pilot or exciter lamp 48 through a lens 48A, which otherwise strikes this reflective area and reflects the beam back to a photodetector 49, through another lens 49A, which advises suitable associated circuitry that such port is empty and ready to receive a copy sheet. As such a copy sheet is inserted it either covers the reflective area 47 or the operator's hand will interrupt the beam from the pilot light 48 that is being reflected back to the detector 49 so that associated latching relay and amplifying relay 50 and 51 will perform their proper functions with respect to flood lighting such a copy sheet by a pulsed light source 52. The light beam from light source 52 passes through diffuser 53 suitably to light such copy sheet and cause a beam 54 bearing an image of the face of such copy sheet to be reflected to oblique mirror 55 forward onto an opposed oblique mirror 56 through path 54A and finally downward to path 54B to impinge on the objective lens 57. The objective lens 57 is supported upon a top platform plate 58 which serves with a lower platform plate 59 to support the microfiche tray, its transport mechanism, the fiche record perforator, and associated mechanisms and parts as will be seen from FIGS. 5 to 15 incl.

It is to be understood that the copy platen 30 inward of the port 29 preferably is transparent so that the lamps can illuminate a document placed below the platen as well as one placed on it.

Figure 6:
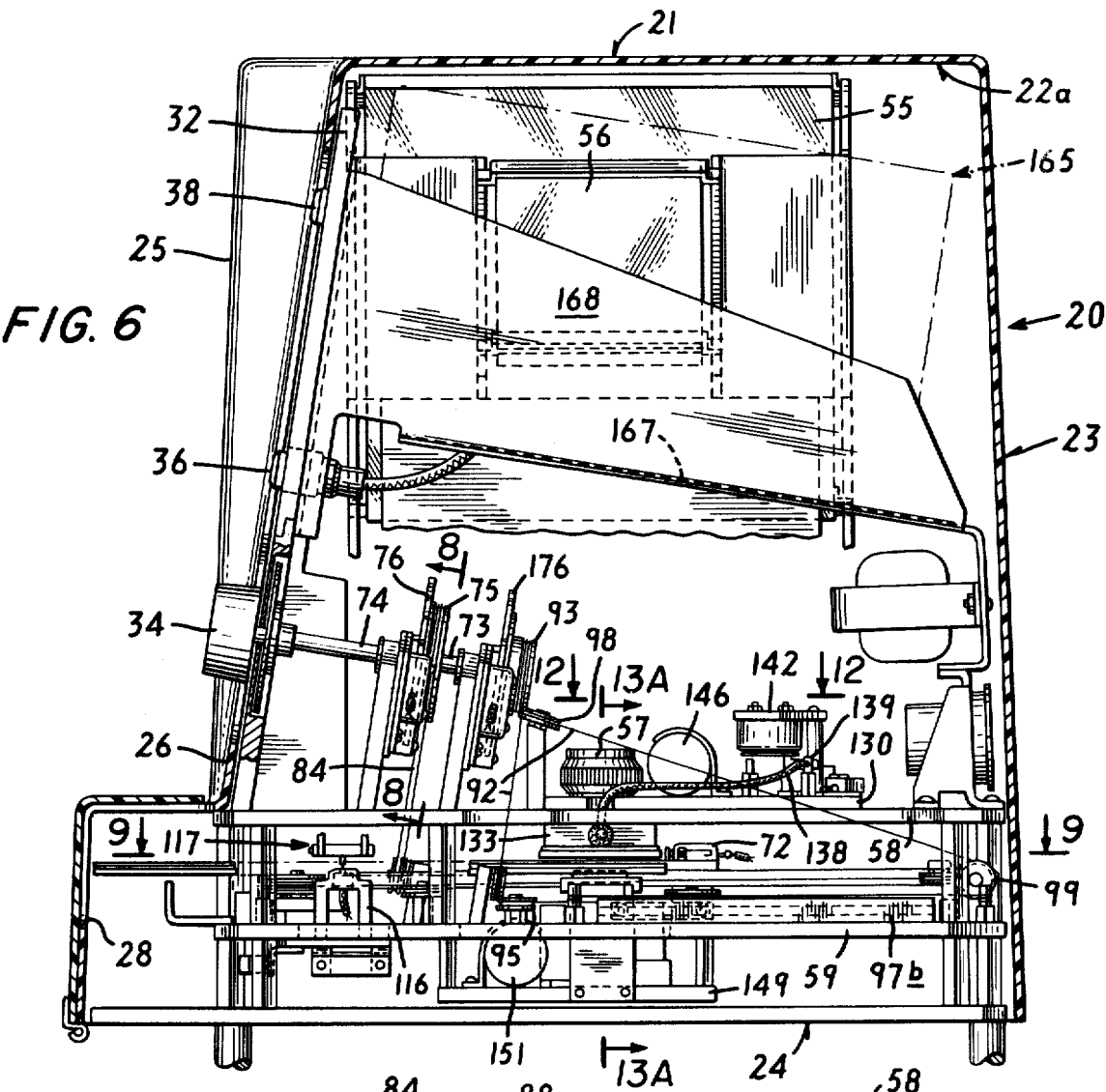
FIG. 6 is a sectional view, with parts broken away taken substantially on line 6—6 of FIG. 5.
Figure 7:
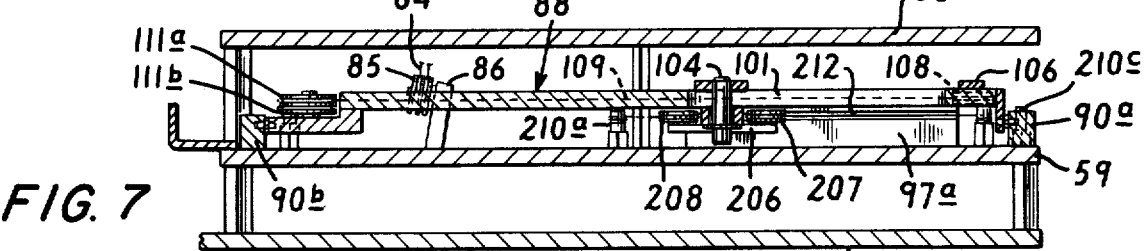
FIG. 7 is a sectional view, with parts broken away, taken substantially on line 7—7 of FIG. 9, illustrating microfiche supporting tray manipulation forward and backward in the Y—Y direction and transversely back and forth in an X—X direction.
Figure 8:
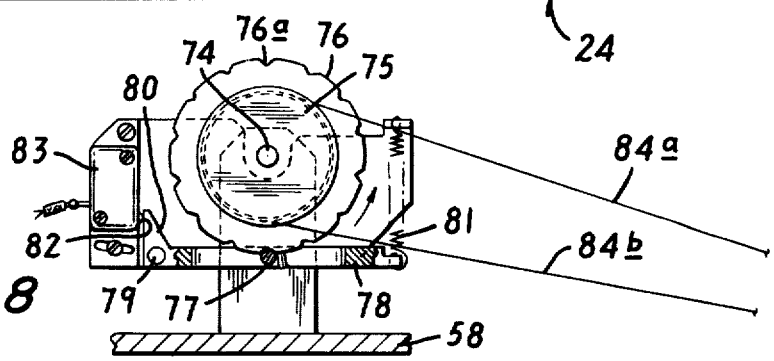
FIG. 8 is a detail side elevational view, with parts broken away, of a manual control capstan of the mechanism shown in FIG. 6 and taken substantially on line 8—8 thereof.
Figure 9:
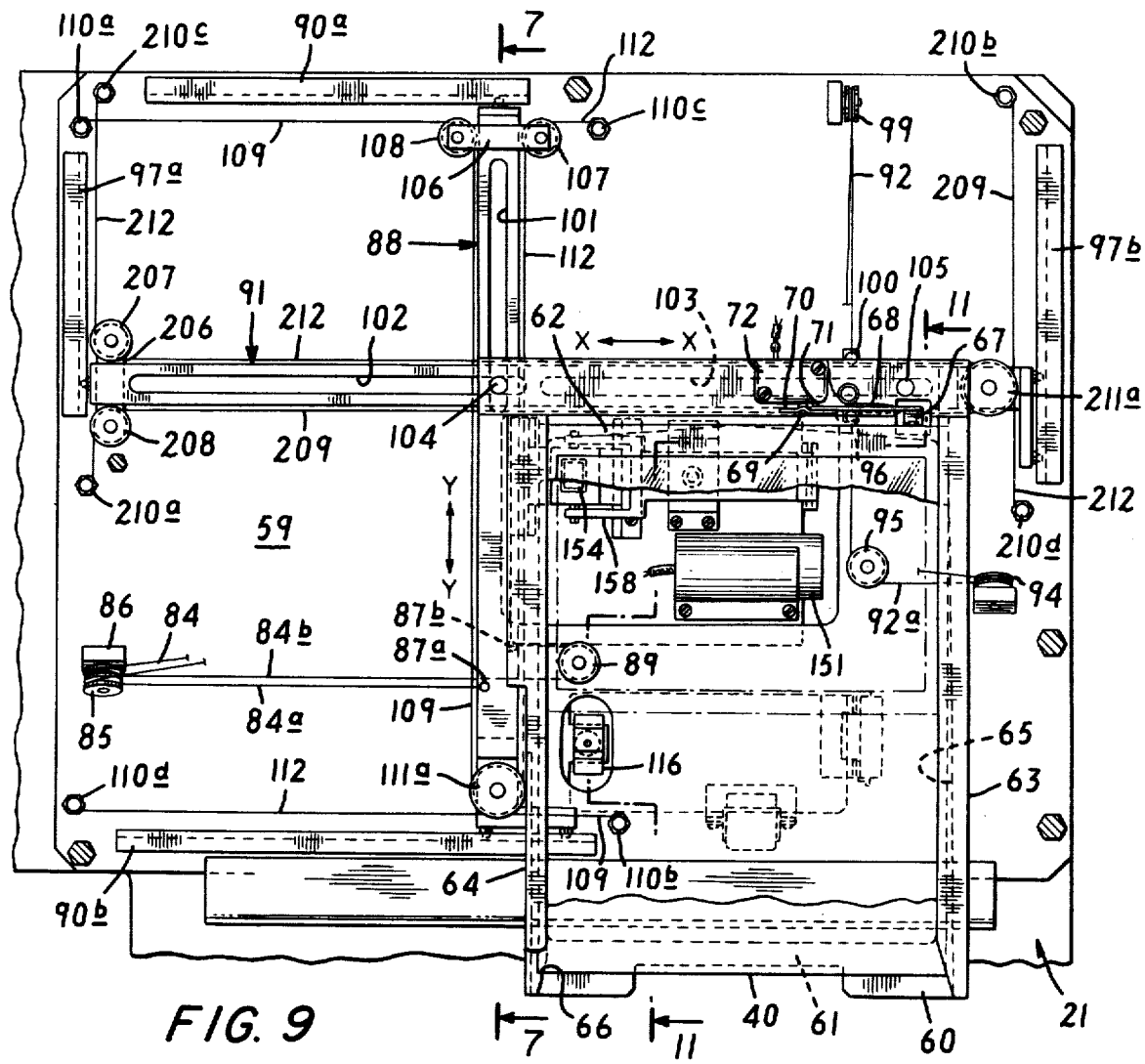
FIG. 9 is a lateral plan view, with parts broken away and in section of this same microfiche tray transport for selective motion in the Y—Y and the X—X directions, and taken substantially on the lateral plane of line 9—9 of FIG. 6.
Figure 11:
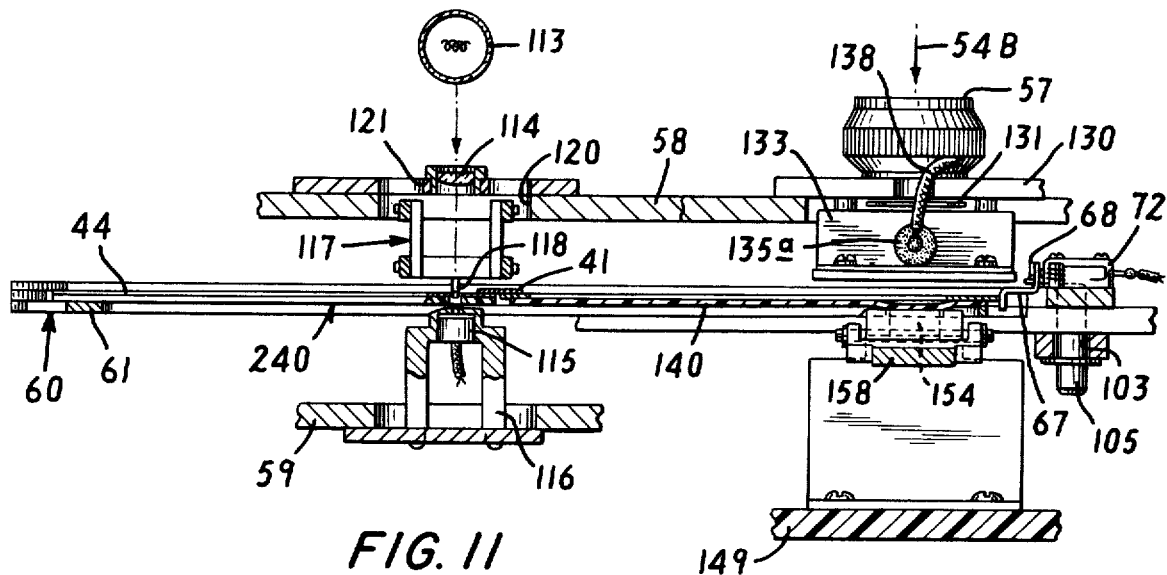
FIG. 11 is an enlarged sectional detail, with parts broken away, taken substantially on line 11—11 of FIG. 9.
Figure 10:
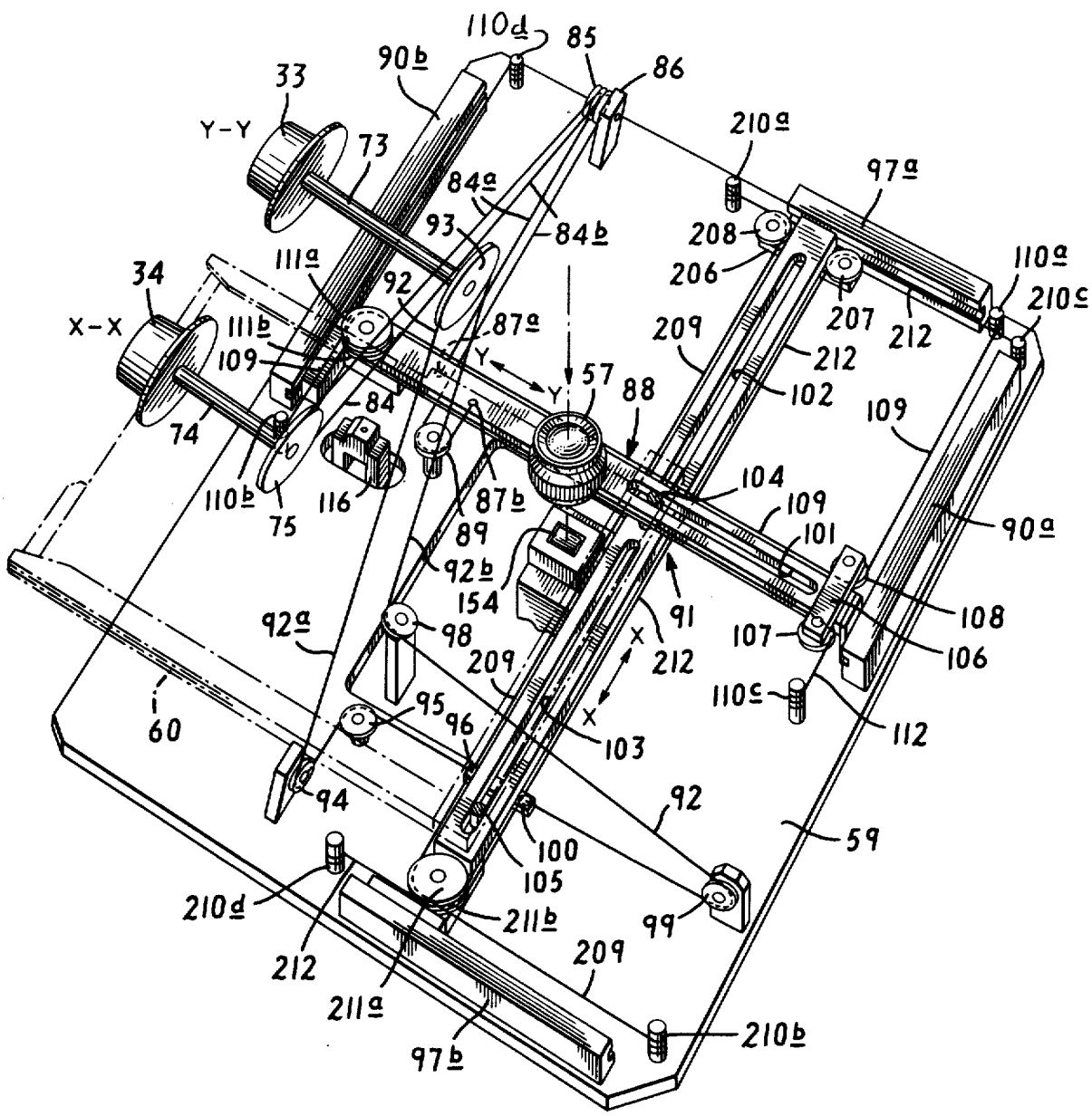
FIG. 10 is a perspective view of the mechanism illustrated in FIG. 9 which is to effect the selective microfiche supporting tray movements in the Y—Y and the X—X directions.

It will be understood from the transverse section of FIG. 5 and the front to back section of FIG. 6, thereof, and sectional details of FIGS. 9, 10, and 11, that the top platform 58 also supports transport mechanism for shifting microfiche tray 60. Microfiche tray 60 includes a front cross bar 61, back crossbar 62, and low sidewalls 63 and 64. It will be best seen from FIG. 9 that sidewall 63 has an inner side groove 65 that is slightly oblique toward the other side of this tray at the rear so that there is a slight canting to the left of the leading or back end of the opened mirofiche as it is inserted. It will also be noted from FIG. 9 that the opposed guide of the opposite sidewall 64 has a shallow notch 66 just to the rear of its front end, so that when such opened microfiche structure is inserted there will be a tendency for it to travel slightly askew toward the left as its inward leading end until abutment at the rear which, if such abutment is on the right hand side would tend to cause its front left corner to swing slightly to the left into the notch 66 for secure retainment. Such a swing abutment is provided by the Z-shaped engagement trigger 67 (FIGS. 9 and 11) carried by a leaf arm 68 which is pivoted at 69 with a leaf spring 70 urging this trigger forward. As the leading back end of the microfiche so engages this trigger 67, as will be seen in FIG. 11, its supporting arm 68 is caused to bear against and depress push button 71 (FIG. 9) of a switch 72 which is provided to detect the presence of the fiche in the apparatus. A fiche is removed from the tray 60 by manually moving its front edge slightly to the right so as to free its left corner from behind the hook defined by the notch 66, for withdrawl from the tray.

It will be seen that FIGS. 9 and 10 illustrate a suitable means of translating the fiche tray orthogonally in the X—X and Y—Y directions that is suitably mounted on the medial or lower platform 59. The two manual knobs 33 (Y—Y) and 34 (X—X) are respectively mounted upon rotary shafts 73 and 74. As will be understood from FIGS. 5, 6, 8, and 10 the knob shaft 74 has fixed thereto a capstan pulley 75 and a detent disk 76 with the periphery of the latter having a series of circumferentially spaced notches 76a successively upon rotation to engage detent 77 carried by a lever arm 78 pivotally mounted at 79 with a nose 80 of the latter depressing by the action of the biasing spring 81 a switch operating button 82 for closure of a switch 83. Assume that the detent disk 76 has fourteen equally spaced notches 76a which will successively engage the detent 77, so as to cause this disk and the associated pulley 75 to be restrained at any one of fourteen positions, so as in turn to provide fourteen stop positions for translation of the microfiche tray 60 in the lateral or X—X direction.

As will be seen from FIG. 10 this is accomplished by a cord or cable 84 medially lapped about pulley 75 with runs 84a and 84b extending therefrom being lapped about a pair of pulleys 85 supported by a bracket 86, with the end of cord 84a ultimately being tied or anchored at 87a to one side of a traveling bar 88 (extending in the Y—Y direction) and the other run 84b of such cord being lapped beyond the bar 88 about another pulley 89 for anchorage to the opposite side of this bar at 87b. Thus, when the manual knob 34 is rotated in one direction the bar 88 will move transversely across the platform 59 between guide side rails 90a and 90b for lateral movement of the tray 60 in one such transverse direction or, when the manual knob 34 is rotated in the opposite direction to reverse the direction of such X—X motion.

A second bar 91 (which extends in the X—X direction) is caused to travel in opposite Y—Y directions by a cord or cable 92 lapped about a pulley 93 fixed on shaft 73 for rotation in opposite directions by manual knob 33. One run 92a of this cable 92 is lapped about successive pulleys 94 and 95 to extend to anchorage at 96 on bar 91 which is translatable in the Y—Y direction by guide side rails 97a and 97b. The other run 92b of this cord is lapped successively about pulleys 98 and 99 to anchorage at 100 at the opposite side of bar 91. Thus rotation of the manual knob 33 in one direction will cause translation in the Y—Y direction and rotation thereof in the opposite direction reverses this travel in the opposite Y—Y direction.

The bar 88 is provided with a single longitudinal slot 101 and the bar 91 is provided with two longitudinal slots 102 and 103. A pin 104 which is fixed to one inner corner of fiche tray 60 extends up through the bar slots 101 and 102 for glide therein, and pin 105 which is fixed to the other inner corner of the fiche tray 60 extends up through the slot 103 for glide therein. Fiche tray pin 104 will always be at the intersection of the two bars 88 and 91 while the other pin 105 confines the fiche tray from rotation about a vertical axis. Suitable provision is also made to assure that the fiche tray is confined to orthogonal motion, which will be understood from FIGS. 9 and 10.

It will be seen from FIGS. 9 and 10 that the bar 88 carries fixed to one end thereof a strap 106 pivotally supporting on opposite ends thereof, to opposite sides of this bar, a pair of pulleys 107 and 108. A cable or cord 109 is fixed at an anchor pin 110a to extend laterally to pulley 108 and lap therearound for extending forwward to lap ninety degrees about pulley 111a on the opposite end of this bar and then extend transversely to anchor pin 110b. Another cable or cord 112 is fixed to an anchor pin 110c to extend to and lap over pulley 107, and then forward along the bar to lap 90° about a second pulley 111b, coaxial with pulley 111a and rotatable independently therefrom, and to extend laterally to anchor pin 110d. Similarly the laterally extending bar 91 carries a transverse strap 206 which pivotally supports on opposite sides of this bar pulleys 207 and 208 with the opposite end of this bar supporting a pair of coaxial pulleys 211a and 211b. A third cable or cord 212 extends from anchor pin 210c forward to, and laps about, pulley 207 for extending laterally along bar 91 for lapping about pulley 211a and then forward to anchor pin 210d. A fourth cord 209 extends from anchor pin 210a back to and about pulley 208 for extending to the opposite end of bar 91 there to lap about pulley 211b and back to anchorage at 210b. This mechanism assures orthogonal motion of the fiche tray 60.

The fact that detent disck 75 is provided with 14 equally spaced peripheral notches 76a is dictated by the fact that there are fourteen successive vertical rows of replica film frames 45 upon the fiche cover and guide section 240, e.g., see the vertical columns headed A in the grid pattern 44 in FIG. 2. Also, since there are seven horizontal rows (A to G incl.) of these frame replicas 45 in such fourteen vertical rows it will be understood that this fact dictates that detent disk 176 fixed on manual control shaft be provided with seven equally spaced peripheral notches. Thus it is an easy matter to select any particular frame in the fiche film 43 which corresponds in the grid pattern 44 for accurate alignment of such film frame with the optical axis 54B which extends down through objective lens 57, e.g., 345 in grid vertical row 5 and horizontal row C, by rotating manual control knob 33 until the letter C shows in its telltale window 33a (FIG. 16), and then rotating manual control knob 34 until numeral 5 is displayed in its window. As a result, the axis of the objective lens 57 is now aligned with the same C-5 position film frame. This is precisely the like result which is illustrated in FIGS. 2 and 16. It is also therein shown that the film frame in the upper left hand corner, at 245, of the film panel 43 (FIG. 2) is in the equivalent position of grid frame 145 which has been marked by the punched hold 46A, as has been previously indicated.

Let it be assumed that suitable means have been employed to so mark a particular film frame replica for indentifying it as indicating that its matching film frame of the fiche has been exposed to imposition thereon of an image by rippled recording. This may have involved the punching of such a hole in the guide grid of the fiche cover at a point rcognized as identifying a certain film frame. The operator may wish to update some information he wishes to associate with this record in an informative manner, but, in doing so, he needs to know where such previous recording is located in the fiche. The present apparatus may provide such means in a form of reading a recording mark that is identifyingly associated with a particular film frame replica of the fiche cover grid, such as a hole punched in a margin of such frame replica.

As is indicated in FIG. 11 means are provided for punching such an indicator hole and thereafter sensing the presence of such a punched hole in an area of the fiche cover section which identifies a certain frame area of the film. It is therein indicated that a light source 113 may be provided above the general detection station which will project light rays down through such a hole in the grid pattern which identifies the associated film frame that may have been at least partially recorded. This light source has associated therewith a suitable converging lens 114 to converge rays of light emanating from the lamp 113 for passing a relatively strong beam through the indicator hole in the fiche cover 240 down upon a photosensor 115 that is supported by an inverted U-shaped bracket 116 which is supported by platform 59. Such light beam will energize this photosensor so as to feed a signal into the electronic circuit of the apparatus. The hole punching mechanism which pierces a hole 46A in the grid web 44 for alignment with hole 46B (FIG. 3A) is indicated at 117 as having a piercing punch 118, and will be best understood by comparison with showings in FIGS. 14 and 15.

Figures 14, 15:
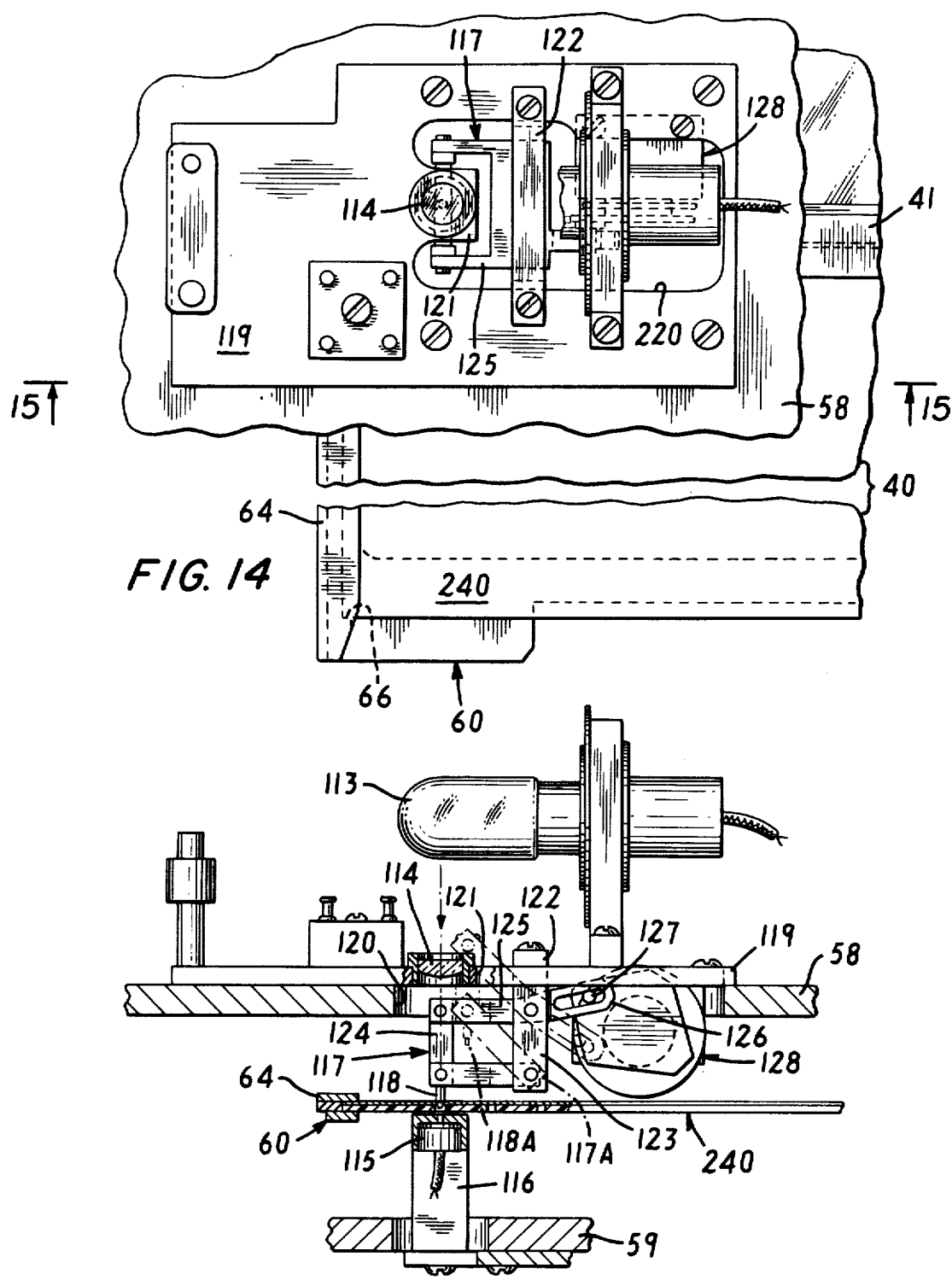
FIG. 14 is an enlarged sectional plan view, with parts broken away of the portion of FIGS. 9 and 11 which show a piercing or punch mechanism to identify a frame of a fiche which may be locaed above the plane of the transport tray illustrated in FIG. 9.
FIG. 15 is a sectional view taken substantially on line 15—15 of FIG. 14.

In FIGS. 14 and 15 it is indicated that a subassembly of light source 113, condenser lens 114 and the punching mechanism 117 are supported by a base plate 119 mounted upon platform 58 with a hole 120 in the latter permitting suspension therebelow from this subassembly mounting place of the punching mechanism, a similar hole 220 being provided in this mounting plate except for the provision of a lateral projection or ear 121 formed on one edge thereof and projecting laterally inward to support the condenser lens 114. Mounting plate 119 supports by a cross strap 122 a rectangular, four-links arm, parallel motion device 117A having its back from structure 123 fixed relative to plate 119 and crossbar 122, and with its front frame structure 124 carrying the punch 118. The top lever arm 125 of this linkage has a slotted extension 126 with the slot thereof receiving a pin 127 that is adapted to be rotated back and forth through an arc by rotary solenoid 128. As a result, in one rotary position of the arcuately swinging solenoid armature the top link 125 will be swung up to the broken line position indicated in FIG. 15, and when the solenoid armature is then caused to swing arcuately back to the full line position of this top lever the punch will be swung forward and down from its lifted end retracted position at 118A to its full line position at 118 for performing the punching action. It is desirable that the swing upward of the punch inherently retracts it from the line of sight between the light source 113 and the punched hole above the photodetector 115.

It will also be seen from FIG. 11 that there is associated with the objective lens 57 and its supporting base plate 130, which is mounted upon platform 58, various components of the sensitized/record subassembly that includes this objective lens. As will be seen from FIGS. 11, 12, and 13A the output, or bottom, side of the objective lens 57 has closely associated therewith a capping shutter blade 131 disposed in a horizontal plane to be swung by a rotary solenoid 132 from a retracted position laterally to one side of the output field of the objective 57 and back to cover the latter protectively for shielding the output lens face from fouling or fogging vapors which may result from outgassing due to heating of a film frame by the conduction means. The rotary capping shutter blade 131, which may be of aluminum or other suitable material, is not essential to the performance of a photographic function since the exposure period starts with corona sensitization and ends with thermoprocessing. However, it can perform such a service, if desired, and, in any event, it is useful to attainment of continued good production of clear images in avoiding the fouling of the objective lens by outgassing.

Immediately below the rotary shutter blade 131 is mounted a corona box 133, which may also be formed of aluminum, and which has passing transversely through its chamber 133a a corona wire 134 extending between nylon insulators 135a and 135b that are mounted through the corona box sidewalls. This corona box chamber 133a preferably may be closed on the bottom by a base plate 136 which may be of relatively rigid plastic, with the top of this box provided with an inlet opening 137a and such plastic base plate provided with an outlet opening in the form of a window 137b which may serve as the optical aperture. When the corona box is of appreciable depth and the transverse corona wire 134 extends from sidewalls of the box appreciably above the bottom of the latter this bottom may be left open, rather than to be closed by an insulative lateral bottom wall 136 having the beam passing opening 137b. Immediately below the corona box bottom plate 136 is located the fiche supporting and translating tray 60 which, as will be seen in FIG. 13A, supports in horizontal orientation the photoplastic film panel 43.

Figure 12:
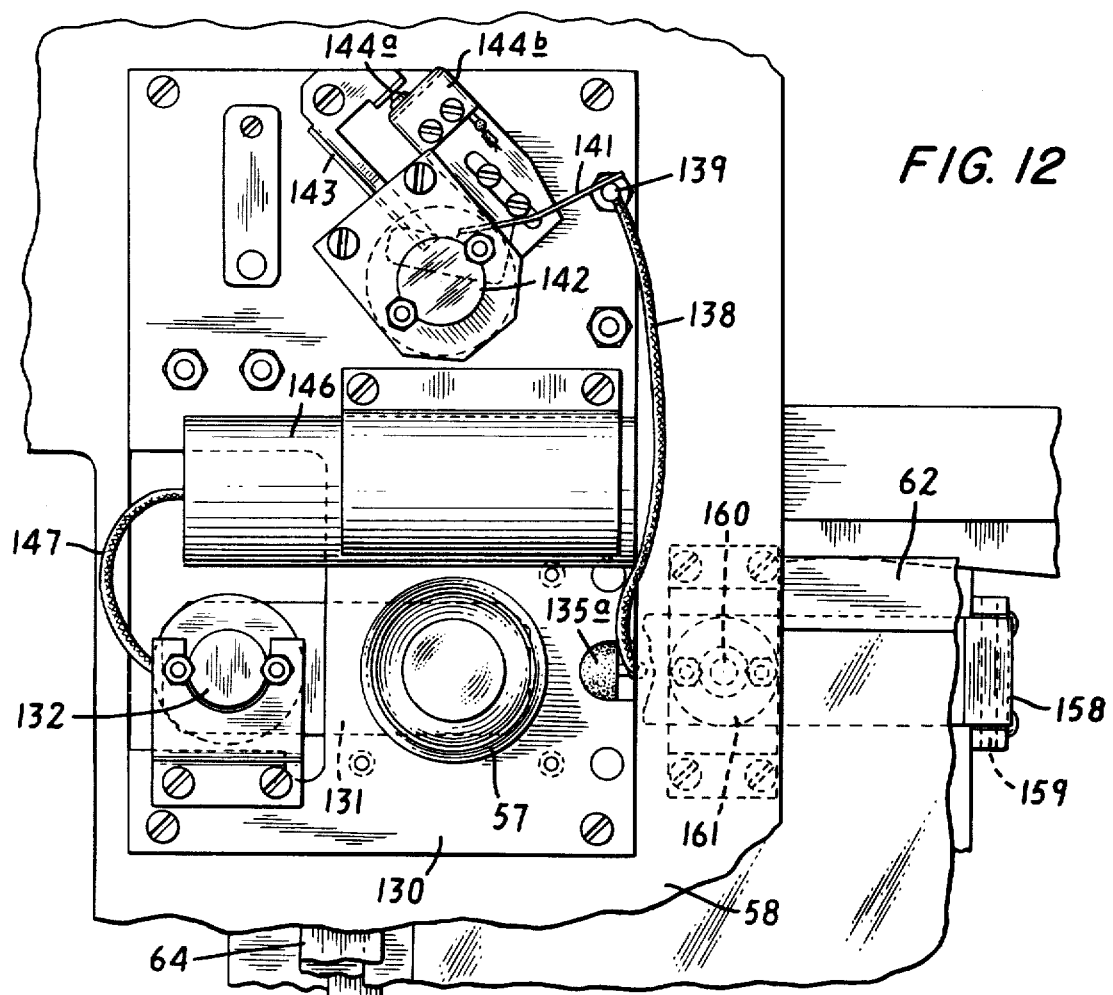
FIG. 12 is an enlarged plan view, with parts broken away, of the optical lens and electrostatic field mechanism as viewed from the lateral top plane at 12—12 in FIG. 6.

It will be understood from FIG. 12 that a means of discharging or grounding the corona wire 134 and also means for energizing the high voltage DC power supply may include a cable or conductor 138 which extends from one electrode-equipped end of this corona wire to a connector post 139 which is insulated from its support. An actuating contact arm 141 is mounted on the armature of a second rotary solenoid 142, so that when this solenoid is de-energized this actuating contact arm contacts the insulated terminal post 139 thereby "grounding" this post and the connecting wire 138 for discharge of the corona wire 134. When this rotary solenoid 142 is energized, the actuating contact arm 141 is swung away from the terminal post 139 and, by means of a link 143, actuates the push button 144a of a switch 144b. Closure of this switch 144b energizes the high voltage DC power supply 146 which raises the potential of the corona wire 134 through conductor 147. Thus, the solenoid 142 is the means for controlling alternately the energizing and discharging of the corona wire.

Figure 13A:
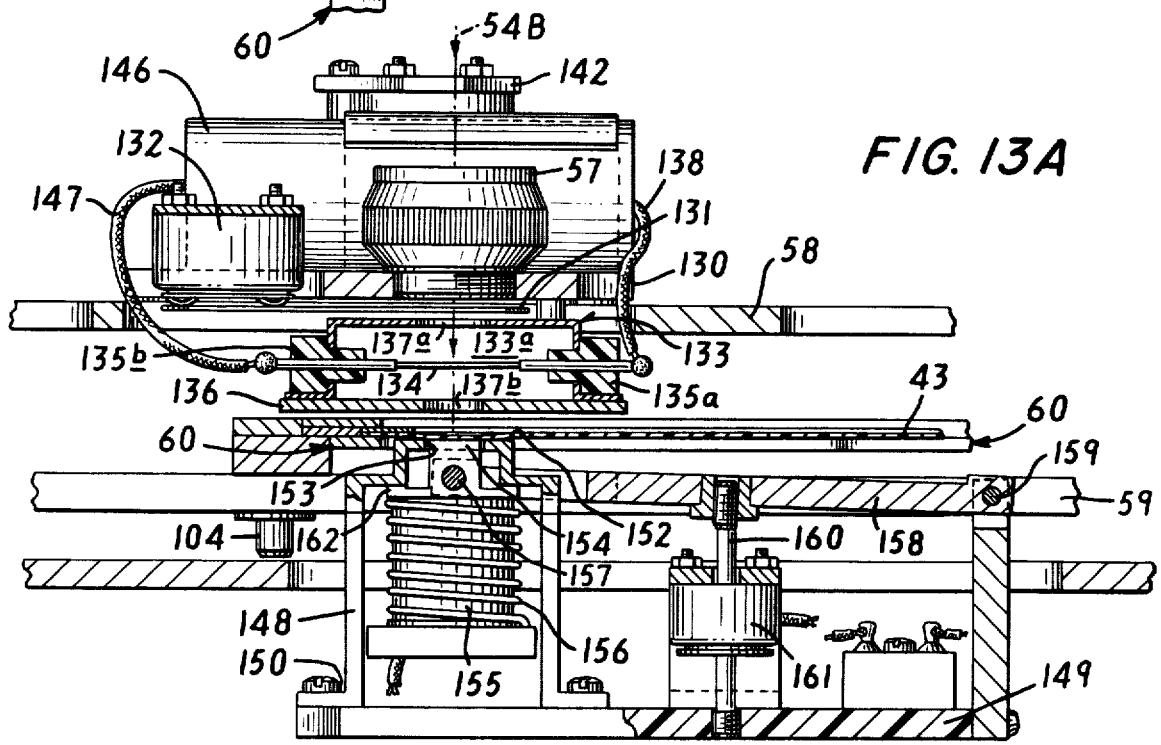
FIG. 13A is an enlarged sectional view taken substantially on line 13A—13A of FIG. 6, with parts broken away.
Figure 13B:
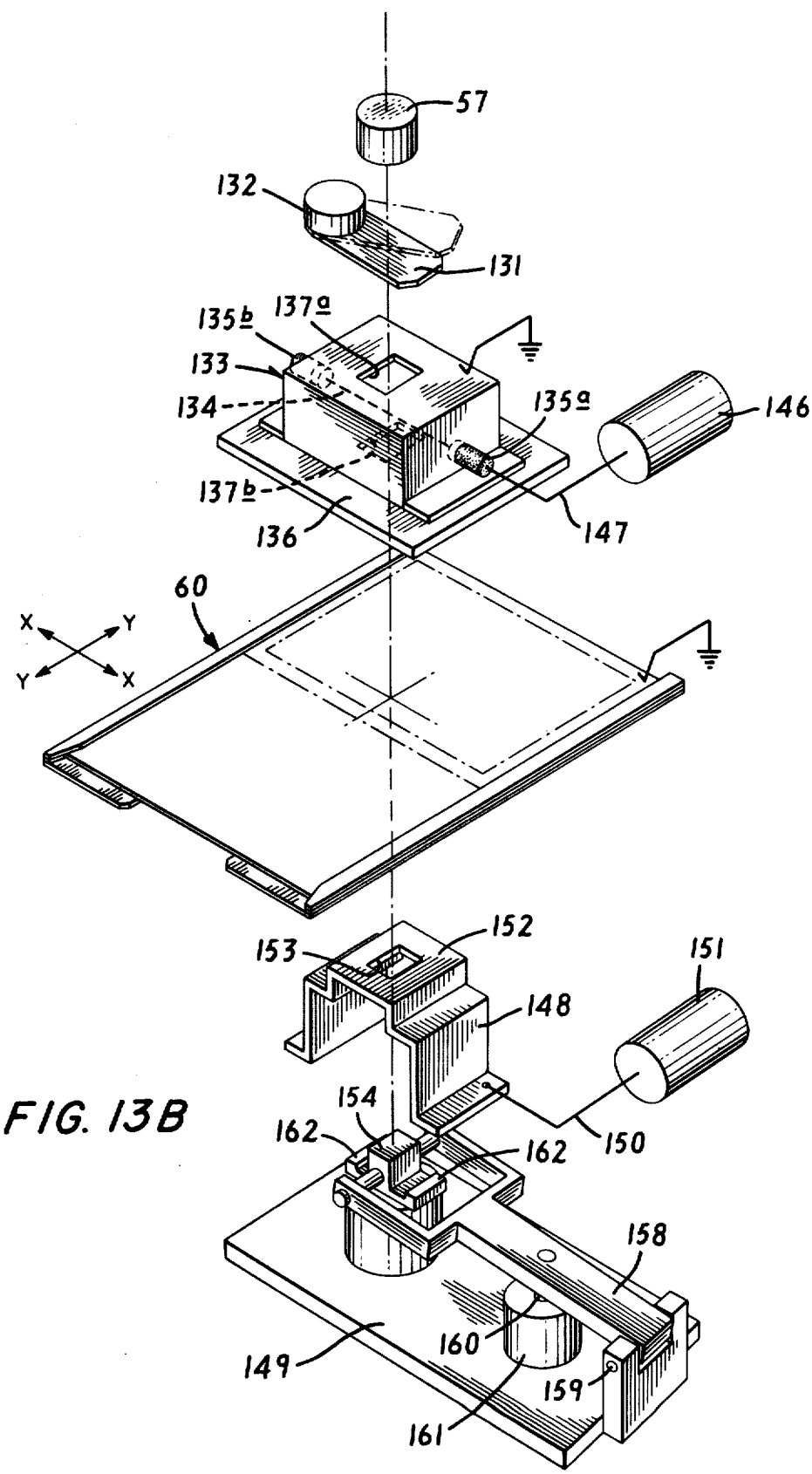
FIG. 13B is an exploded perspective view of the optical, electrostatic charging, and heating mechanisms which are shown in assembled condition in FIG. 13A.

It will also be seen from FIGS. 12 and 13A that the fiche supporting tray 60 carries therein the photoplastic film section 43 of the fiche, so that, selectively, frame areas thereof may be manipulated laterally and back and forth through the operations of the manual knobs 33 and 34 for alignment of such film frames successively with the exit opening 137b of the corona box 133. Below this photoplastic film panel 43 is mounted a platen bracket 148 suitably supported upon an insulated shelf 149 that is suspended from platform 59. This inverted U-shaped platen, which may be formed of aluminum, is maintained at a relatively high positive potential by being connected by conductor 150 to another high voltage DC power supply, indicated at 151 in FIG. 6, as well as in FIG. 13B. As a result of this high positive potential the section of the film 43 which is located above the top surface 152 of this platen is caused to cling thereto since a substrate of this photoplastic film is maintained at "ground" potential. As a result this charged platen locates the section of the film to be processed accurately at the focal plane of the objective lens 57. The top of the platen 148 is a substantially flat wall with its upper surface 152 providing the desired planular seat for the film, and this wall has a substantially rectangular hole 153 therein which is about the dimensions and shape of a film frame (such as that indicated at 245 in FIG. 2). A metallic block 154 is provided on the top end of a metal core 155 which has wound thereabout an electrical heating cable 156, which may be nickel-chromium wire, to raise the temperature of this core and surmounted block to a desired degree which is controlled by a thermo-sensor within the core. The block 154 is substantially of the same shape and size of each of the film frames, so that when such a section of the film and adjacent margins thereof are drawn down thereagainst by the relatively high positive potential of the conductive substrate of the film for snug adherence to the platen top surface 152 and the rectangular top surface of the block 154 the latter will be held snugly against the film frame area for transfer of heat to the latter therefrom, so as to soften this area of the film. There is thus direct conductive heat transfer from the heat block 154 directly to the contacting film frame area.

The heat block 154 and its contacting or integral heating core 155 are suspended for free up and down limited movement within the platen 148, such as by a transverse pin 157 which is carried by an outer end of a pivoted lever 158 of the third class that is pivotally supported on an upright of the insulated shelf 149. This lever, when swung up and down, lifts and lowers the heat block 154 between a position where its top section is located within the rectangular platen hole 153 to have its top surface co-planar with the top surface 152 of the platen, as shown in FIG. 13A, and a lower position of retraction, so as to separate the heat block and the bottom surface of the film frame. The lever 158 is swung up by a lift of the armature and its stem 160 of energized linear solenoid 161, and drops down upon deenergization of this solenoid. The rise of the heat block by such upward swing of the lever 158 is limited by any suitable means, such as lateral side flanges or fins 162 (best seen in FIG. 13B) for engagement to the underside of the platen top wall with the top surface of this heat block co-planar with the platen top surface 152. Heat transfer to the photoplastic film from the hot block when the latter is lifted to contact of the conductive Mylar base layer thereof causes the emulsion to soften. Also, contact of the hot block with the film-supporting platen at some edge portions of the platen hole and of the fins with the platen top wall causes the block to assume the electrical potential of this platen so that the film area is snugged to form. Thus thermal transfer of this film portion is enhanced. The maintenance of the substrate conductive layer of the film at "ground" potential establishes electrostatic sensitization, and with the platen therebelow charged to about (+)2500 VDC the "clamping" attraction thereto is quite satisfactory.

The emulsion of this polyplastic film is softened sufficiently for a completely effective erase procedure at a temperature that is close to the melting point of the indium top coating and the working temperature of the Mylar base layer. For example, good emulsion softening results and ripple image processing of the film emulsion may be attained if the heating is at a working temperature of about 90° C. and this thermal processing is maintained for about 2 seconds. For effective erasure this temperature must be raised to about 125° C. for about the same period of time. Consequently more positive and reliably controllable heating procedure in normal operating environments than either radiant or convection methods has been found to be necessary, and the present contact or conduction heating has been found to be the reliable solution. The heating block of the present apparatus may be normally maintained at about such working temperature of approximately 90° C. for the particular photoplastic film being employed, to be moved to contact of the Mylar base layer of the film and then with maintenance of such contact for any desired period since the length of such conduction heating is not critical. For the erase cycle the heat of this contact block should be raised to about 125° C., but again no particular period of time of maintenance of such contact with the hot block is critical. However, it may be desirable to maintain these periods of contact heating for about 2.0 seconds each. These temperatures are rather critical for these procedures. Contact heating by such means in the erase mode is more reliable than is convection and radiant heating. In convection heating anything which develops air currents in the vicinity greatly affects the erase mode heating, and environment may also affect the radiant heating operation. Further, more reliable operation is inherently attained by such contact heating since it eliminates without requirement of measures or care to be taken to otherwise eliminate "cross talk" (recording in any adjacent frame "noise" or interference from the frame being worked).

The photographic and processing cycle as practiced with the present apparatus may extend over a period of about 4 seconds. During the first half of this period the capping shutter may be opened or swung away from interception of the light beam extending between the objective and the corona charging device for focusing the optical image therein upon the film specular surface. Simultaneously, with the opening of the shutter, the corona power supply preferably is energized for approximately one-half second. The corona wire of this corona device is charged approximately at (−)5000 to 6000 V. for the first half second of the exposure, and then its potential decays to some lower differential potential during the remainder of the period. During the second half of this 4 seconds processing period the hot block is raised quickly to and maintained in contact with the base layer of the film. Since the maximum output current of these high voltage DC power supplies is about 5 micro-amperes their output is harmless to the operators and servicing personnel.

Snugging or "clamping" of such photoplastic film having a conductive substrate by simply supporting an area of the base layer, with the emulsion layer of the film upward, upon an electrostatically charged platen is important to the successful use of the present camera/processor apparatus since it eliminates any necessity for mechanical clamping means or vacuum hold-down. Also, such "clamping" or snugging means does not interfere with lateral translation of such a photoplastic film section across the surface of the platen for substitution of one film section or frame for another in a position of alignment with the center of the platen surface for the opening therein. Such means of "clamping" or snugging such photoplastic film to supporting platen structure is equally useful and advantageous in "Reading" apparatus which directs a beam of light to the rippled image bearing emulsion layer or a reflective surfacing thereover for causing an image bearing beam to be directed to an observation screen.

The high voltage DC power supply which charges the film area supporting platen could be either at positive or negative potential, just so long as the desired differential relative to the "ground" in the plural-layer film is obtained. The charged platen will attract the "ground" layer of the film regardless of whether the relatively large electrostatic differential charge is negative or positive. However, athough the film is grounded the corona does induce a relatively small negative charge on the emulsion surface or its overlying reflective surface layer of indium, or the like. Thus it is preferable to charge the platen positive.

In FIG. 17 is shown a block diagram of the operative control circuitry of the camera/processor of the present invention, and indicating by diagrammatic means connection thereto of the various control and responsive elements for operation of the apparatus in any of its three modes of operation, i.e., (1) "Annotate/Replace Mode," (2) "Erase Mode," and (3) "Record/Mode." The operative components of the control circuitry, as distinguished from the responsive elements connected thereto and the directive controls for demanding operation of the responsive elements selectively conveniently may be collected together as a package 165 for equipment storage (FIG. 6) behind the casing panel 26 (FIGS. 1 & 16) in space 166 (FIG. 5), with this package preferably resting upon an oblique panel 167 located between a pair of laterally-spaced sidewalls, one of which is shown at 168 in FIG. 6. In FIG. 17 four classes of components that interact with the "CONTROL CIRCUITRY" are illustrated. These classes are indicated hereinafter.

I. OPERATING COMPONENTS

These components are controlled by the Control Circuitry and cause appropriate sensitization (a), photographic exposure (b), thermal processing and erasure (c) of the photoplastic fiche. Additional functions of these components are to electrostatically hold the fiche into position (d), and to encode the fiche (e). Eight components are included in this classification:

| | |
|---|---|
| 1. Copy Illuminator 52 (b); | 5. Solenoid (Heater) 161 (c); |
| 2. Shutter 131 (b); | 6. Heater 156 (c); |
| 3. Shorting Solenoid 142 (a); | 7. High Voltage Hold-down 151 (d); and |
| 4. Corona Supply 134, 146 (a); | 8. Encoder Assembly 117–128 (e). |

II. OPERATOR CONTROLS

The Operator Controls provide for the operator to signal the Control Circuitry as to his desire to have certain functions or sequences of functions accomplished.

III. SENSORS

There are various sensors provided to inhibit operator error and to insure the accurate thermal function of the Heater. These sensors signal the Control Circuitry relative to the status of the equipment. The following five sensors are included:

| | |
|---|---|
| 1. Fiche Position — x-y Sensor 83; | 4. Code Reader Sensor 115; and |
| 2. Fiche Loaded Sensor 72; | 5. Thermal Sensors (in core 155.) |
| 3. Copy Change Sensor 49; | |

IV. STATUS AND INSTRUCTION DISPLAY

The Status and Instruction Display panel 39 presents visual data to the operator. This data informs the operator as to the status of the equipment and instructs him as to what manual operations are required. This panel is controlled by the Control Circuitry.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is the novel subjects matter defined in the following claims:

1. In an optical camera and image processing apparatus for selectively producing rippled message images in frame areas of specular surfaced photoplastic film by image patterned electrostatic charge and heat deformation and effectively heat erasing any such images at higher temperatures for re-recording the erased frame areas, the combination with
   a. means temporarily to support a record sheet having a light-reflective outer face that bears an image which is to be reproduced optically upon a film portion with said means permitting ready removal of the sheet for replacement by another record sheet;
   b. means to direct light rays upon the image-bearing outer face of the record sheet when temporarily supported by said means;
   c. film supporting means mounted in a fixed position and having an optical aperture therein behind which may be temporarily supported in a transverse plane of fixed position a photoplastic film section having a specular surface in which may be produced a rippled image of the record sheet image when at least a portion of this specular surface is exposed in the optical aperture to patterned electrostatic charge and rippling heat deformation;
   d. optical means in front of said film supporting apertured means to direct a recording image-bearing light beam reflected from the image-bearing face of the supported record sheet directly to said aperture and including in the optical path thereof an objective lens unit located a focal distance from said record sheet supporting means that is adapted to project the image-bearing beam in focus upon the film specular surface portion when exposed in the aperture;

e. means interposed in the optical path between said lens unit and said aperture and in the vicinity of the latter while being spaced therefrom to produce electrostatic charges throughout the entire area of said aperture simultaneously and impose them upon the film specular surface portion when exposed in said aperture with this imposition being effected in a latent pattern corresponding to the darker areas of the image borne by the light beam and with this film surface being irradiated directly by said light beam; and f. powered equipment and controls to operate various components of the apparatus; of g. a lateral platen located immediately back of the film section transverse plane for providing rearward support for the zones of the section of such film which will margin the specular surface area thereof that is to be exposed in the optical aperture, said platen having an opening opposite said optical aperture whereby the back of this section of the film that will be opposite its specular surface area is accessible;

h. a metallic block of readily heatconductive material movably mounted in a manner to be moved forward into said platen opening for contact of the accessible area of the back of such film section;

i. means to heat said block to a relatively moderate temperature which will effect sufficient heat conduction softening of the area of this film section that will be located between said optical aperture and said platen opening as to produce the desired rippled image in the film surface of this film area while this surface is being irradiated; and j. means selectively to increase the temperature of this metallic block to an appreciably higher temperature which will by heat conduction contact with this film area intervening said optical aperture and platen opening raise the temperature thereof sufficiently to erase the image rippling of this film area without film destructive heating thereof for re-recording of this film area.

2. The apparatus as defined in claim 1 characterized by the combination with a photoplastic film section which has an upper heat-softenable and image rippleable emulsion layer providing a specular surface and a conductive substrate below this layer serving as an electrostatic grounding means with the back of an area of such film supported upon said lateral platen, and means imposing a relatively large electrostatic charge differential upon said platen to cause the area of said film that is in contact with said platen to be snugged to the latter by electrostatic charge adherence.

3. The apparatus as defined in claim 1 characterized by said means for producing electrostatic charges and imposing them upon the film specular surface being a corona member confined in a chamber defined by conductive walls including an inlet one opposed to the objective lens unit having an opening therein for entrance of the image-bearing beam and those defining laterally surrounding sides whereby said walls serve as a collector for corona discharge, the chamber having an outlet opening facing toward said film supporting platen for passage of the beam to said film 4. The apparatus as defined in claim 3 characterized by said outlet opening being the bottom of said chamber which is absent a transverse bottom wall with said corona member being located an appreciable distance within the chamber from this open bottom.

5. The apparatus as defined in claim 3 characterized by said chamber being defined on all sides, including the transverse bottom thereof, with walls, said transverse bottom wall being of plastic and having as the outlet opening a beam passing window aligned with the inlet opening.

6. The apparatus as defined in claim 3 characterized by the provision of movable shutter means located between said objective lens unit and the inlet opening in said corona chamber structure to be manipulated transversely between open and closed positions with said shutter means in closed position interrupting the image bearing light beam projected through said objective lens unit toward said corona chamber inlet opening, said beam being permitted to pass from said lens unit to and through said inlet opening in the open position of said shutter means, and means under the control of the operator dictating the manipulation of said shutter means between its open and closed positions.

7. The apparatus as defined in claim 6 characterized by said shutter being a rotary vane and a suitably powered manipulative device to rotate said vane between its open and closed positions.

8. In an optical camera and image processing apparatus for selectively producing rippled message images in frame areas of specular surfaced photoplastic film by image patterned electrostatic charge and heat deformation, the combination of optical means to project an image-bearing light beam along a path to an inlet end of and through an objective lens unit, elctrostatically chargeable platen means having a transverse surface in a transverse plane beyond the outlet end of said lens unit at the focal point of the latter, a photoplastic film area having its specular surface facing back toward the outlet end of said lens unit and immediately beneath its specular surface a heat-softenable emulsion layer, means grounding said film, a relatively high voltage DC power supply connected to said platen means electrostatically charging it at a potential of appreciable differential value with respect to ground creating a hold-down force snugging the bottom surface of said film area to said platen surface while permitting said film to be moved laterally across said surface for change of film areas supported by said platen surface, an electrostatic charging device in the form of a corona source mounted in a grounded chamber between said lens unit and said film area with the top of said chamber having a light beam inlet opening and the bottom of said chamber having a light beam outlet opening with the axes of said openings being substantially coaxial with the image-bearing light beam axis which will extend therethrough to said platen support surface, the latter surface having an opening therein with the axis thereof coaxial with the top and bottom openings of said chamber and with the size and shape of this platen opening being substantially like that of an intended image frame of said platen-supported film area, and conductive film frame heating means closely fitting in said platen surface opening while permitting retraction thereoutof, said heating means having a film bottom surface contacting surface which is coplanar with said platen surface, whereby said platen supported film area and its frame are held snugged by the electrostatic charge against said platen surface and said heating means contacting surface.

9. An optical apparatus for using specular surfaced photoplastic film to bear or bearing rippled message images in frame areas thereof which has a conductive substrate below its upper heat-softenable and image rippleable emulsion layer serving as an electrostatic grounding means, platen means having a lateral film supporting surface with an area of the latter adapted to be contacted by the lower side of an area of specular surfaced photoplastic film, means to impose a relatively large electrostatic charge differential upon said platen to cause the platen contacting film side to be snugged to said platen by electrostatic charge, adherence, said platen film supporting surface having an opening therein, and retractable conductive film frame heating means fitting into said opening whereby said heating means and said platen cooperatively support the film area lower side and said heating means can heat-soften the film emulsion layer above this film lower side.

* * * * *